United States Patent [19]
Rumpf et al.

[11] 3,900,338
[45] Aug. 19, 1975

[54] WATER SOLUBLE BLOCK POLYMERS USED AS SILT CONTROL AGENTS

[75] Inventors: Regis Robert Rumpf, Coraopolis; David Elmer Farley, Oakdale; Lawrence James Guilbault, McMurray, all of Pa.

[73] Assignee: Calgon Corporation, Pittsburgh, Pa.

[22] Filed: Apr. 30, 1974

[21] Appl. No.: 465,716

[52] U.S. Cl. .................... 134/22 R; 210/54; 210/58
[51] Int. Cl.² ..... B08B 9/00; C02B 1/20; C02B 5/06
[58] Field of Search ............... 134/22 R; 210/54, 58; 252/82, 180; 260/875

[56] References Cited
UNITED STATES PATENTS

| | | | |
|---|---|---|---|
| 2,922,768 | 1/1960 | Mino et al. | 260/875 R X |
| 2,940,952 | 6/1960 | Miller | 260/875 R |
| 3,146,193 | 8/1964 | Sullivan | 210/54 |
| 3,256,141 | 6/1966 | Stephenson | 210/54 X |
| 3,288,640 | 11/1966 | Flock | 210/58 X |
| 3,493,500 | 2/1970 | Volk et al. | 210/54 |
| 3,709,816 | 1/1973 | Walker et al. | 134/22 R X |
| 3,752,760 | 8/1973 | Gordon et al. | 210/54 X |

*Primary Examiner*—S. Leon Bashore
*Assistant Examiner*—Marc L. Caroff
*Attorney, Agent, or Firm*—Rudolph J. Anderson, Jr.; Harry E. Westlake; Martin L. Katz

[57] ABSTRACT

Water-soluble block polymers of the A-B-A type wherein the A block is derived from a water-soluble monomer and the B block is derived from N-vinyl pyrrolidone for use as silt control agents.

2 Claims, No Drawings

WATER SOLUBLE BLOCK POLYMERS USED AS SILT CONTROL AGENTS

This invention relates to a composition and method for removing and preventing accumulations of mud and silt in cooling systems.

More particularly, this invention relates to a composition and method for removing and preventing accumulations of mud and silt in cooling systems in which water-soluble polymeric compositions of the A-B-A type wherein the A block represents from 10 to 100,000 mer units of a water-soluble monomer and the B block represents from 10 to 5,000 mer units of N-vinyl pyrrolidone is used as the silt control agent.

Deposits of silt and alluvium are often found in cooling towers, once-through cooling systems, and the like. Such deposits impair the heat transfer capacity of the unit not only by limiting the circulation of water, but by insulating the hot metal surface to be cooled.

Prior to the present invention, several types of polymers have been used as silt control agents. For example, U.S. Pat. No. 3,085,916 discloses the use of polyacrylamides, U.S. Pat. No. 3,288,640 discloses the use of polyethylene-imine, and U.S. Pat. No. 3,709,816 discloses the use of polymers of 2-acrylamido methyl propane sulfonic acid for this purpose.

We have found, however, that the water-soluble polymer compositions of the instant invention are more effective silt control agents than these aforementioned prior art polymers.

The ceric ion method taught by U.S. Pat. No. 2,922,768 and J. Macromolecular Science-Chemistry, A7(8), 1581 (1973) has been found to be a convenient means of accomplishing the block copolymer synthesis of the instant invention.

Suitable water-soluble monomers include dimethyl diallyl ammonium chloride, 3-acrylamido-3-methyl butyl trimethyl ammonium chloride, methacryloyloxy-2-hydroxypropyl trimethyl ammonium chloride, methacryloyloxyethyl trimethyl ammonium chloride, methacryloyloxylethyl trimethyl ammonium methosulfate, 2-acrylamido-2-methyl propane sulfonic acid, acrylic acid, and salts thereof, methacrylic acid, 3-acrylamido-3-methyl butyl dimethylamine, acrylamide, methacrylamide, diacetone acrylamide, hydroxymethylated diacetone acrylamide, dimethyl-1-(2-hydroxypropyl) amine methacrylamide, and sodium styrene sulfonate. The preferred monomers, however, are 3-acrylamido-3-methyl butyl trimethyl ammonium chloride, 2-acrylamido-2-methyl propane sulfonic acid, dimethyl diallyl ammonium chloride, methacryloyloxyethyl trimethyl ammonium chloride, methacryloyloxyethyl trimethyl ammonium methosulfate, and acrylamide. The acrylamide may be unhydrolyzed or hydrolyzed (up to 50% hydrolyzed).

Our polymers may be used in quantities as little as 0.05 p.p.m. We know of no lower limit beyond which they are absolutely ineffective; a very small amount is effective to a small degree. Although a practical limit will be reached at a maximum of about 20 p.p.m., there is no reason why more, i.e. up to 200 p.p.m., cannot be used. Our preferred range is about 1 to about 5 p.p.m.

This invention relates to methods of prevention, control, and removal of alluvium in aqueous systems through the use of the polymers described above. The polymers are added in dried or dissolved form to the water to be treated, and circulated into and through the system in contact with the alluvium and silt, which may be suspended or already deposited. The silt or alluvium thereby forms a light floc and is flushed out of the system. For best results, the polymer should be added continuously or periodically.

The invention will be better understood by the following examples which illustrate the preparation and effectiveness of representative polymers of this invention.

EXAMPLE 1

Preparation of Poly(Vinylpyrrolidone-b-Acrylamide)

A 1 liter, 4-neck flask fitted with a mechanical stirrer, condenser, nitrogen inlet and catalyst addition tube was charged with 16.00 g. acrylamide, 2.78 g. poly(vinylpyrrolidone), m.w. = 360,000 and 500 ml. distilled water. After stirring the contents for an hour under a nitrogen purge, a solution of 0.123 g. ceric ammonium nitrate, 2.25 ml 1 N $HNO_3$ and 10 ml water was added dropwise over a three hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 86% yield, exhibited an intrinsic viscosity in 1 N $NaNO_3$ of 6.3 dl/g. The composition of the block polymer, determined by infrared analysis was 90 mole percent acrylamide, 10 mole percent vinylpyrrolidone. The following equation (Guilbault and Brooks, J. Macromolecular Science-Chemistry, A7(8), 1581 (1973), was employed to calculate the molecular weight of the acrylamide end blocks:

$$G = \left(\frac{S}{C} - S\right)/N$$

Where
 $G$ = d.p. of the end blocks
 $S$ = d.p. of poly(vinylpyrrolidone) = 3200
 $N$ = no. of end blocks per poly(vinylpyrrolidone) block = 2
 $C$ = composition, as mole fraction of vinylpyrrolidone The block polymer structure calculated by this method was:

(Polyacrylamide)――(Polyvinylpyrrolidone)――(Polyacrylamide)
Mol Wt. $1 \times 10^6$　　　　　　$3.6 \times 10^5$　　　　　　$1 \times 10^6$

EXAMPLE 2

Preparation of Poly(Vinylpyrrolidone-b-Acrylamide)

A 1 liter, 4-neck flask fitted with a mechanical stirrer, condenser, nitrogen inlet and catalyst addition tube was charged with 6.75 g acrylamide, 0.56 g poly(vinylpyrrolidone), m.w. =360,000 and 100 ml distilled water. After stirring the contents for an hour under a nitrogen purge, a solution of 0.052 g ceric ammonium nitrate, 0.95 ml 1 N $HNO_3$ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 90% yield, exhibited an intrinsic viscosity in 1 N NaNO₃ of 7.5 dl/g. The composition of the block polymer, determined by infrared analysis was 95 mole percent acrylamide, 5 mole percent vinylpyrrolidone.

The block polymer structure, calculated by the method of Example 1 was:

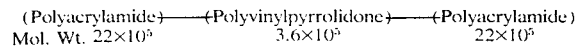
Mol. Wt.  $22 \times 10^5$    $3.6 \times 10^5$    $22 \times 10^5$

EXAMPLE 3

Preparation of Poly(Vinylpyrrolidone-b-Acrylamide)

A 1 liter, 4-neck flask fitted with a mechanical stirrer, condenser, nitrogen inlet and catalyst addition tube was charged with 13.33 g acrylamide, 6.95 g poly(vinylpyrrolidone), m.w. = 360,000 and 500 ml distilled water. After stirring the contents for an hour under a nitrogen purge, a solution of 0.103 g ceric ammonium nitrate, 1.88 ml 1 N HNO₃ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 85% yield, exhibited an intrinsic viscosity in 1 N NaNO₃ of 3.2 dl/g. The composition of the block polymer, determined by infrared analysis was 73 mole percent acrylamide, 27 mole percent vinylpyrrolidone.

The block polymer structure, calculated by the method of Example 1 was:

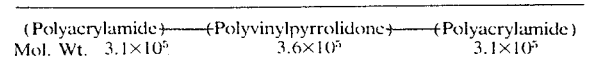
Mol. Wt.  $3.1 \times 10^5$    $3.6 \times 10^5$    $3.1 \times 10^5$

Extraction experiments demonstrated that the polyvinylpyrrolidone present in the product is incorporated into the block polymer structure. A sample (6.22 g) of a 27.9 mole percent vinylpyrrolidone block polymer was extracted with refluxing methanol (a good solvent for polyvinylpyrrolidone) in a Soxhlet Thimble for 24 hours. The extracted sample weighed 6.20 g and analyzed for 27.1 mole percent vinylpyrrolidone.

EXAMPLE 4

Preparation of Poly(Vinylpyrrolidone-b-Acrylamide)

A 1 liter, 4-neck flask fitted with a mechanical stirrer, condenser, nitrogen inlet and catalyst addition tube was charged with 8.88 g acrylamide, 13.88 g poly(vinylpyrrolidone), m.w. =360,000 and 500 ml distilled water. After stirring the contents for an hour under a nitrogen purge, a solution of 0.069 g ceric ammonium nitrate, 1.25 ml 1 N HNO₃ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 83% yield, exhibited an intrinsic viscosity in 1 N NaNO₃ of 3.4 dl/g. The composition of the block polymer, determined by infrared analysis was 56 mole percent acrylamide, 44 mole percent vinylpyrrolidone.

The block polymer structure, calculated by the method of Example 1 was:

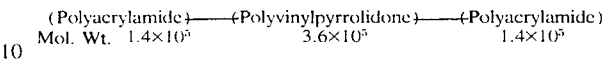
Mol. Wt.  $1.4 \times 10^5$    $3.6 \times 10^5$    $1.4 \times 10^5$

EXAMPLE 5

Preparation of Poly(Vinylpyrrolidone-b-Acrylamide)

A 1 liter, 4-neck flask fitted with a mechanical stirrer, condenser, nitrogen inlet and catalyst addition tube was charged with 5.33 g acrylamide, 19.43 g poly(vinylpyrrolidone), m.w.=360,000 and 500 ml distilled water. After stirring the contents for an hour under a nitrogen purge, a solution of 0.041 g ceric ammonium nitrate, 0.75 ml 1 N HNO₃ and 10 ml water was added dropwise over a 3 hour period. The reaction solution became very viscous and wrapped around the stirrer shaft. After 16 hours at room temperature, the resulting polymer gel was precipitated into methanol in a blender. The solid product was isolated, washed with methanol and dried in vacuo. The product, obtained in 54% yield, exhibited an intrinsic viscosity in 1 N NaNO₃ of 3.5 dl/g. The composition of the block polymer, determined by infrared analysis was 50 mole percent acrylamide, 50 mole percent vinylpyrrolidone.

The block polymer structure, calculated by the method of Example 1 was:

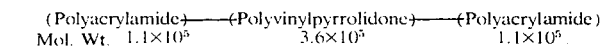
Mol. Wt.  $1.1 \times 10^5$    $3.6 \times 10^5$    $1.1 \times 10^5$

EXAMPLE 6

Preparation of
Poly(Vinylpyrrolidone-b-2-Acrylamido-2-Methyl
Propane Sulfonic Acid)

This polymer was prepared in a manner analogous to Example 1, using 5.18 g 2-acrylamido-2-methyl propane sulfonic acid, 8.33 g poly(vinylpyrrolidone), m.w. = 360,000 and 100 ml water. The catalyst solution contained 0.25 ml 1N HNO₃, 0.014 g ceric ammonium nitrate and 10 ml water. The product, obtained in 76% yield was isolated from the reaction gel by precipitation into acetone. Utilizing the equation of Example 1, the molecular weight of each end block was found to be $1 \times 10^5$, and that of the poly(vinylpyrrolidone) center block, $3.6 \times 10^5$. The block polymer contained 24 mole percent anionic monomer units, as measured by infrared analysis.

EXAMPLE 7

Preparation of
Poly(Vinylpyrrolidone-b-2-Acrylamido-2-Methyl
Propane Sulfonic Acid)

This polymer was prepared in a manner analogous to Example 1, using 15.53 g 2-acrylamido-2-methyl propane sulfonic acid, 2.78 g poly(vinylpyrrolidone), m.w. =360,000 and 100 ml water. The catalyst solution contained 0.75 ml 1N $HNO_3$, 0.041 g ceric ammonium nitrate and 10 ml water. The product, obtained in 54% yield was isolated from the reaction gel by precipitation into acetone. Utilizing the equation of Example 1, the molecular weight of each end block was found to be $4.8 \times 10^5$, and that of the poly(vinylpyrrolidone) center block, $3.6 \times 10^5$. The block polymer contained 60 mole percent anionic monomer units, as measured by infrared analysis.

EXAMPLE 8

Preparation of Poly(Vinylpyrrolidone-b-2-Acrylamido-2-Methyl Propane Sulfonic Acid This polymer was prepared in a manner analogous to Example 1, using 10.35 g 2-acrylamido-2-methyl propane sulfonic acid, 5.55 g poly(vinylpyrrolidone), m.w. =360,000 and 100 ml water. The catalyst solution contained 0.50 ml 1N $HNO_3$, 0.027 g ceric ammonium nitrate and 10 ml water. The product, obtained in 61% yield was isolated from the reaction gel by precipitation into acetone. Utilizing the equation of Example 1, the molecular weight of each end block was found to be $2.1 \times 10^5$, and that of the poly(vinylpyrrolidone) center block, $3.6 \times 10^5$. The block polymer contained 39 mole percent anionic monomer units, as measured by infrared analysis.

EXAMPLE 9

Preparation of Poly(Vinylpyrrolidone-b-Methacryloyloxyethyl Trimethyl Ammonium Chloride This polymer was prepared as in Example 1, using 10.86 g of the cationic monomer, 5.55 g poly(vinylpyrrolidone), m.w. =360,000 and 100 ml water. The catalyst solution, comprised of 0.50 ml 1N $HNO_3$, 0.274 g ceric ammonium nitrate and 10 ml water, was added at the beginning of the reaction. The product was obtained in 78% yield by precipitation of the reaction mixture into acetone. The block polymer contained 51 mole percent cationic monomer units, as measured by chloride titration. Utilizing the equation of Example 1, the molecular weight of each end block was found to be $3.4 \times 10^5$, and that of the poly(vinylpyrrolidone) center block $3.6 \times 10^5$.

EXAMPLE 10

Preparation of Poly(Vinylpyrrolidone-b-Methacryloyloxyethyl Trimethyl Ammonium Chloride This polymer was prepared as in Example 1, using 16.30 g of the cationic monomer, 2.78 g poly(vinylpyrrolidone), m.w.=360,000 and 100 ml water. The catalyst solution, comprised of 2.5 ml 1N $HNO_3$, 1.37 g ceric ammonium nitrate and 10 ml water, was added at the beginning of the reaction. The product was obtained in 63% yield by precipitation of the reaction mixture into acetone. The block polymer contained 80 mole percent cationic monomer units, as measured by chloride titration. Utilizing the equation of Example 1, the molecular weight of each end block was found to be $13 \times 10^5$, and that of the poly(vinylpyrrolidone) center block $3.6 \times 10^5$.

EXAMPLE 11

Preparation of Poly(Vinylpyrrolidone-b-Methacryloyloxyethyl Trimethyl Ammonium Chloride)

This polymer was prepared as in Example 1, using 5.44 g of the cationic monomer, 8.33 poly(vinylpyrrolidone), m.w.=360,000 and 100 ml water. The catalyst solution, comprised of 0.75 ml 1N $HNO_3$, 0.411 g ceric ammonium nitrate and 10 ml water, was added at the beginning of the reaction. The product was obtained in 89% yield by precipitation of the reaction mixture into acetone. The block polymer contained 20 mole percent cationic monomer units, as measured by chloride titration. Utilizing the equation of Example 1, the molecular weight of each end block was found to be $0.8 \times 10^5$, and that of the poly(vinylpyrrolidone) center block $3.6 \times 10^5$.

EXAMPLE 12

The effectiveness of the polymers of the instant invention as silt control agents is illustrated in Table I and Table II.

A suspension of a synthetic mixture of clays and metal oxides was prepared in distilled water in a graduated cylinder. The time required for the silt to settle to the bottom of the cylinder was measured and recorded. The silt was redispersed in the water and the suspension was dosed with a dilute polymer solution. The time required for the treated silt to settle was measured and recorded. The ratio of the settling time for untreated silt ($tc$) to the settling time for silt treated with polymer ($t$) was calculated. The ratio ($tc/t$) is defined as the efficiency factor (E) and is a measure of polymer utility. The most desirable polymers are those producing the highest E values.

Table I compares the performance of our novel block polymers with that of conventional water-soluble polymers of varying composition. Polymer dosages are expressed in milligrams of polymer per liter of synthetic silt suspension.

Table I

| Polymer Used | Dosage (mg/liter) | Settling Time (sec.) | (Efficiency Factor) |
| --- | --- | --- | --- |
| None (control) | — | 97.7 (tc) | — |
| Homopolymer of Acrylamide | 0.4 | 46.5 | 2.1 |
|  | 1.0 | 33.7 | 2.9 |
| *Polyvinylpyrrolidone/ | 0.4 | 15.5 | 6.3 |
| Acrylamide triblock polymer | 1.0 | 12.5 | 7.8 |
| *Random Copolymer of N-vinyl pyrrolidone and acrylamide | 0.4 | 48.8 | 2.0 |
|  | 1.0 | 34.9 | 2.8 |
| *Physical Blend of poly-(vinylpyrrolidone and poly-(acrylamide) | 0.4 | 46.5 | 2.1 |
|  | 1.0 | 33.1 | 2.95 |
| Homopolymer of poly(vinyl-pyrrolidone) | 0.4 | 88.8 | 1.1 |
|  | 1.0 | 88.6 | 1.1 |

*Composition = 95 mole percent acrylamide, 5 mole percent vinylpyrrolidone.

Data in Table I demonstrate that maximum performance is obtained from polymers with the unique triblock structure.

Table II compares the performance of our anionic block polymers with that of conventional water-soluble anionic polymers of varying compositions. Polymer dosages are expressed in milligrams of polymer per liter of synthetic silt suspension.

Table II

| Polymer Used | % Hydrolysis (or % Anionic) | Dosage (mg/l) | Settling Time (sec.) | Efficiency Factor |
|---|---|---|---|---|
| None (control) | — | None | 97.7 | — |
| 49/51 AM/2-AMPSA* Copolymer | 51.0% | 0.4<br>1.0 | 42.5<br>31.5 | 2.3<br>3.1 |
| None (control) | — | None | 93.1 | — |
| Hydrolyzed PAM* | 5.0% | 0.4 | 33.8 | 2.75 |
| Hydrolyzed PAM | 15.0% | 0.4 | 33.3 | 2.80 |
| Hydrolyzed PVP-AM* Triblock Polymer | 12.0% | 0.4 | 11.7 | 7.96 |
| Hydrolyzed PVP-AM Triblock Polymer | 23.0% | 0.4 | 11.6 | 8.00 |
| Hydrolyzed PVP-AM Triblock Polymer | 19.5% | 0.4 | 13.5 | 6.90 |
| PVP-AM-Potassium* Triblock Polymer | 10.0% | 0.4 | 35.0 | 2.66 |
| PVP-AM-Potassium Triblock Polymer | 15.0% | 0.4 | 17.0 | 5.48 |
| PVP-AM-Potassium Triblock Polymer | 20.0% | 0.4 | 24.1 | 3.86 |

*AM = Acrylamide
*2-AMPSA = 2-Acrylamido-2-Methyl Propane Sulfonic Acid
*PAM = Polyacrylamide
*PVP-AM = Polyvinylpyrrolidone-Acrylamide
*PVP-AM-Potassium = Polyvinylpyrrolidone-Acrylamide-Potassium Acrylate

We claim:

1. A method of removing alluvium and silt deposits and inhibiting the deposition of alluvium and silt in aqueous systems comprising adding to the water in said aqueous system at least 0.05 ppm of a polymer of the formula A-B-A wherein the A block represents from 10 to 100,000 mer units of acrylamide and the B block represents from 10 to 5,000 mer units of N-vinylpyrrolidone, flowing said water in contact with the deposits in said system thereby forming a flock and flushing said water containing said flock out of said system.

2. A process as in claim 1 wherein the acrylamide is partially hydrolyzed.

* * * * *